Patented May 13, 1947

2,420,390

UNITED STATES PATENT OFFICE 2,420,390

DRYING OIL COATING COMPOSITIONS

Thomas C. Whitner, Elizabeth, N. J., assignor to Chemical Laboratories, Inc., a corporation of New Jersey No Drawing. Application October 22, 1943,
Serial No. 507,349

13 Claims. (Cl. 260—18)

This invention relates to coating compositions which contain a pigmenting material consisting only of organic substances. This invention involves particularly the utilization of organic pigments in coating compositions which contain a drying oil.

In the preparation of coating compositions, as for example, paints and printing inks, the pigmenting or coloring materials are usually metallic in origin. Illustrations of such pigments are the bright red sulfide of mercury, the yellow chromates of lead and zinc, and the white dioxide of titanium. In other cases, pigment lakes have been employed, these lakes consisting often of an insoluble substance such as aluminum oxide, arsenic oxide, phosphomolybdic acid, phosphotungstic acid, and the like, containing adsorbed or occluded dyestuffs.

I have observed that the synthetic resinous materials made by the condensation of an aliphatic saturated aldehyde with a saturated aliphatic ketone, such as described in my copending application Ser. No. 453,878, filed August 6, 1942, entitled Process for making synthetic resin, possess adsorbent properties for dyes to a very remarkable degree, and that the resinous materials containing adsorbed dyes can be utilized as pigmenting agents in coating compositions.

The coating compositions according to this invention comprise a drying oil as a liquid medium, a pigmenting agent consisting of an insoluble condensation product of a saturated acyclic aldehyde with a saturated acyclic ketone and containing an adsorbed dye, and a drying agent for the oil. Drying oils which are suitable for my purpose include those which may be designated as vegetable or naturally-occurring, those which may be called prepared oils, and those which are known as synthetic oils. Examples of suitable vegetable oils are linseed oil, tung oil, oiticica oil, perilla oil and the like. These oils may be used either in the raw state or after subjection to a bodying process, as desired. Prepared oils can be exemplified by those oils resulting from a thermal treatment or a dehydrogenation of a naturally-occurring vegetable oil, e. g., oils made by the thermal treatment of castor oil or sunflower-seed oil. Another type, applicable in the coating compositions of this invention, is that made by the oxidation of vegetable oils, for example, blowing air through cottonseed oil maintained at a temperature, say, of 120° C. Synthetic drying oils can be made by any one of a number of processes, such as chlorination and then dechlorination of paraffin or cycloparaffin hydrocarbons, polymerization of olefinic hydrocarbons or the copolymerization of monolefinic and diolefinic hydrocarbons, by oxidizing petroleum hydrocarbons with air or ozonized air, and in many other ways. Either an individual drying oil or a mixture of two or more drying oils of the above-indicated types can be employed in the coating compositions suitable for my purpose.

A wide variety of drying agents, or siccatives, are applicable. Illustrations of such agents are the heavy-metal salts of carboxylic acids, such as the lead, manganese or cobalt naphthenates, resinates or linoleates. In some instances it may be desirable to employ the corresponding salts of other heavy metals such as the naphthenates, resinates or linoleates of iron, nickel, chromium or uranium as well as those of lighter metals such as zinc, calcium or magnesium. Any one of these above-mentioned drying agents or appropriate mixtures of them may be employed.

As the substrate of the pigmenting agent I use an insoluble resinous product prepared by condensation of a saturated aliphatic or acyclic aldehyde with a saturated aliphatic or acyclic ketone. These insoluble resinous bodies can be made, for example, in a two-stage process. In the first stage, the aldehyde is condensed with the ketone in an aqueous or other suitable liquid medium using a mild inorganic alkaline catalyst such as disodium hydrogen phosphate or trisodium phosphate. The condensation product in this instance is a thick, viscous, heavy liquid which is soluble in water, alcohol and other solvents. In the second stage, the soluble condensation product is converted into the insoluble resinous material by the action of a suitable alkaline contact agent, as for example, a tetra-alkylol ammonium hydroxide as described in my copending application Ser. No. 453,878, filed August 6, 1942. Another method for changing the soluble condensation product into the insoluble form comprises subjecting the soluble material to the action of a strong alkaline inorganic contact agent, such as sodium or potassium hydroxide.

Adsorption of dye by the insoluble condensation product may be accomplished in any convenient manner. For example, a solution of the dye in water is made and this solution then agitated with or filtered through a mass of the insoluble resinous material. The latter should be in a fine state of subdivision so that a large surface of insoluble resin is exposed to or in contact with the solution of dye. In this manner a uniformly colored pigmenting material is secured. Adsorption of the dye can be effected at any appropriate temperature, e. g., at room temperature or at a somewhat elevated temperature such as the boiling point of the dye solution. One treatment of the insoluble resinous material with the dye solution may be sufficient to furnish a pigmenting agent of the desired shade or depth of color. If not, then the resin can be subjected two or more times to the action of the solution or dye.

After a pigmenting composition of the proper shade of color has been obtained, it is washed with water or the liquid serving as the dye solvent, dried, and ground, if the last-named operation is necessary. Instead of drying and then grinding, this latter operation may be performed while the colored pigmenting composition is in the moist condition. Or, the dried colored resin may be admixed with drying oil and the mixture subjected to grinding.

The above-mentioned method of effecting adsorption of dye by the insoluble resinous product is satisfactory when the dye is soluble in a liquid solvent. However, I do not wish to limit coloring of the pigmenting composition or agent to only those dyes which are soluble in water or other solvents. For example, if it be desirable that the insoluble resin contain an adsorbed vat dye, then the latter can be reduced to its colorless or leuco form which is soluble in water and the resin treated with an aqueous solution of the leuco compound. After a sufficient quantity of the leuco body has been adsorbed, then the resin containing adsorbed leuco compound is separated from the aqueous solution and exposed, while in a damp or moist condition, to the atmosphere. This last step effects oxidation of the colorless form to the colored form of the dye thus resulting in the resin becoming colored.

Although the principal ingredients of my coating compositions are a drying oil, a pigment agent of organic origin, and a drying agent for the oil, I do not wish to limit my compositions to only these three ingredients. Various modifying agents can be incorporated as may be found necessary or desirable. Illustrations of such modifiers are synthetic or natural waxes (e. g., paraffin wax, beeswax, etc.), petroleum jelly, metallic salts of carboxylic acids such as stearic, oleic or palmitic acid (such salts lacking the property of a drying agent or siccative), wool fat, and the like. In some instances either natural or synthetic oil-soluble resins may be incorporated, as for example rosin, oil-modified phenol-aldehyde or glycerol-phthalic anhydride resins, cumarone resins, chlorinated biphenyl, ester gum, etc. It should be remembered that the proportion or proportions of such modifying agents must be carefully regulated otherwise in some instances drying or hardening of films of the coating composition may be unduly prolonged if not substantially inhibited.

In addition to the drying oil as the liquid ingredient, there may be added also a small proportion of another liquid as a thinning agent. Examples of liquids which may serve as thinners are turpentine, dipentene, varnish makers and painters naphtha, kerosene and rosin oil. Thinners, especially those which are volatile and which do not of themselves yield a dry or hard film, should be present in minor proportions. The coating compositions of this invention dry or harden due to the action of air or the atmosphere on the drying oil and not because of evaporation of the liquid medium from or adsorption or absorption of the liquid medium by the surface to which the composition is applied. In other words, the drying oil constitutes a major proportion of the liquid medium and any thinning agent forms a minor proportion of the liquid medium.

The following examples will serve as illustrations of my invention.

Example 1.—To 15 parts of acetone mixed with 15 parts of water were added 1 part of crystalline disodium hydrogen phosphate and 0.25 part of crystalline trisodium phosphate dissolved in 5 parts of water. To this mixture, placed in a container to which was attached a reflux condenser, were added 20 parts of trioxymethylene in 4 equal portions. After each addition the mixture was warmed gently to initiate reaction and thereby disappearance of the trioxymethylene. After all of the latter was added, the reaction mixture was heated gently on a water bath for several hours, and then allowed to stand overnight at room temperature.

The reaction mixture was decanted from some insoluble material which formed and evaporated on a water bath until only a thick, viscous syrup remained as a residue. The latter was permitted to cool to room temperature, whereby some insoluble material separated and this was removed by filtration. The liquid product was a clear, colorless syrup. It was miscible with and readily soluble in water, alcohol, acetone and other analogous solvents.

Example 2.—A portion of the syrup from Example 1 and a portion of an aqueous alcoholic aqueous solution containing 40 per cent of tetraethanol ammonium hydroxide were admixed in the proportions of 1 part of syrup to 0.5 part of hydroxide solution. The mixture was warmed gently on a water bath to hasten resinification. Afterwards, the resinous mass was washed with water to eliminate all alkaline material, and air dried. Next, it was ground to a powder.

The ground resin was agitated with a small volume of an aqueous solution of a water-soluble red dye, the mixture allowed to settle, and the substantially colorless aqueous solution withdrawn. This operation was repeated several times until a deep red pigment was obtained. The latter was washed with water to remove any adhering dye solution, and then air dried.

A coating composition was prepared by grinding 1 part of the pigmenting agent with 4.5 parts of linseed oil and then adding and well mixing 0.72 part of a white mineral spirits solution of lead, manganese and cobalt naphthenates. The concentration of the salts was equivalent to 2 per cent of cobalt, 2 per cent of manganese and 8 per cent of lead in the solution of drying agent.

This composition, when spread on a wood surface and exposed to the atmosphere, dried to a hard film having a red color.

Example 3.—A portion of the resin syrup from Example 1 was admixed with an equal weight of 40 per cent aqueous potassium hydroxide, and the mixture was warmed gently until resinification to a light yellow, ivory-colored resin had occurred. The resin was cut into small pieces, washed well with water to remove the alkali, and then it was air dried.

The resinous material was ground, and afterwards treated for 30 minutes with an aqueous solution of a water-soluble yellow dye, the temperature of the solution being kept at approximately 80° C. In this instance an excess of dye was employed and consequently the dye solution was not completely exhausted by the resin. Next, the latter was separated by filtration from the solution of dye, washed well with cold water, and air dried. A light yellow pigmenting agent was secured.

A coating composition was prepared by using the following ingredients in the proportions mentioned: yellow pigmenting agent, 1 part; linseed oil, 2.33 parts; cumarone resin (melting 95–125° C.), 0.13 part; drier solution (as in Example 2), 0.42 part. The oil and resin were admixed and warmed to secure solution, and the latter cooled to room temperature and the pigmenting agent ground with it. Next, the solution of drier was admixed thoroughly with the oil and pigment composition.

The resulting coating composition, though free-flowing and rather liquid, could be spread on wood and on exposure to the atmosphere dried to a solid, yellow film exhibiting a slight glossy appearance.

*Example 4.*—A clear resin-forming syrup was prepared in the manner described in Example 1 with the exception the 15 parts of methyl ethyl ketone and 15 parts of trioxymethylene were employed as the reactants.

*Example 5.*—A portion of the syrup from Example 4 and 35 per cent aqueous potassium hydroxide were admixed in the proportions of 1 part of syrup to 0.5 part of alkali solution. The mixture was warmed gently on a water bath until a light yellow resinous mass was formed. The latter then was broken into small pieces, washed well with water to remove alkali, and while wet and admixed with water was ground to a mass of fine particles. These were treated at room temperature with successive portions of an aqueous solution of a water-soluble blue dye until they became light blue in color, and afterwards were washed with water and air dried. In the case of this particular resin, when it was attempted to effect adsorption of the dye at a temperature of approximately 100° C., the resinous particles melted and became a liquid mass. On cooling the mass of liquid resin became solid again at room temperature.

*Example 6.*—A liquid vehicle was prepared by admixing linseed oil and a phenol-aldehyde resin (known as Bakelite #254) in the proportions of 2.5 parts of oil to 2 parts of resin, and heating the mixture (with stirring) until a temperature of 280° C. was attained. The resulting clear liquid was allowed to cool to approximately 90° C. and while kept at that temperature turpentine, in the proportion of 1 part, was added and incorporated by stirring until a homogeneous clear liquid was obtained. This was permitted to cool to room temperature.

A coating composition was prepared by admixing and grinding this liquid vehicle with pigmenting agent from Example 5, in the proportions of 1.75 parts of vehicle to 0.75 part of pigment. Afterwards, there was incorporated naphthenate drier solution (as used in Example 2) in the proportion of 0.1 part.

The resulting composition had a consistency approaching that of a printing ink. Films of the composition on either paper or wood, when exposed to the atmosphere, became hard and possessed a light blue color.

*Example 7.*—A resin syrup was prepared in the following manner: 15 parts of acetone were admixed with 15 parts of water, and to this mixture was added a solution consisting of 1 part crystalline disodium hydrogen phosphate and 0.25 part of crystalline trisodium phosphate in 10 parts of water. To the resulting aqueous solution (placed in a suitable container to which was attached a reflux condenser) were added 20 parts of trioxymethylene in 4 equal portions. The reaction mixture was warmed after each addition of trioxymethylene to effect solution of the latter and its interaction with the ketone. Afterwards, the reaction mixture was heated on a water bath for 2 hours and then allowed to remain at room temperature over night. Next, it was diluted with approximately an equal volume of water, the pH of the solution adjusted to a value of 7 and kept at that value while a sufficient quantity of aqueous barium chloride was added to effect precipitation of all soluble phosphate as barium phosphate. The latter was removed by filtration and the remaining clear solution was concentrated on a water bath until a clear, syrupy liquid was obtained. This was cooled to room temperature and was filtered from any insoluble material which precipitated during the cooling period.

*Example 8.*—Some of the syrupy liquid from Example 8 was admixed with aqueous alcoholic solution containing 40 per cent tetraethanol ammonium hydroxide, in the proportion of 1 part syrup to 0.5 part hydroxide solution. The mixture was warmed gently on a water bath and resinification occurred quickly. The resinous mass was cut into small pieces and these were washed with cold water to remove alkali.

The washed resin was treated several times with successive portions of an aqueous solution of a water soluble black dye. When the resin became black in color, it was washed with water to remove any adhering dye solution, and then air dried.

*Example 10.*—A liquid vehicle was prepared by admixing heat-processed gum copal with linseed oil in the proportions of 0.5 part of gum to 2 parts of oil, and heating the mixture until solution occurred. The solution was allowed to cool to room temperature and then ground with pigmenting agent as prepared in Example 9, using the proportions of 3 parts of oily liquid to 1 part of pigment. Afterwards, naphthenate drier solution (as used in Example 2) was added in the proportion of 0.09 part to the ground mixture of oil and pigment. The resulting coating composition was liquid though somewhat viscous in character. When it was spread on wood or on glass and was exposed to the atmosphere, it dried to a black film.

It will be seen from the foregoing description that my invention relates to coating compositions which comprise a drying oil, an organic pigmenting agent, and a siccative or drying agent. The pigmenting agent consists of an insoluble resinous condensation product of an aliphatic or acyclic saturated aldehyde with an aliphatic or acyclic saturated ketone and a dye adsorbed on the insoluble product. I do not wish to limit my invention to a pigmenting agent containing only one adsorbed dye. The resinous product may be treated, for example, with a solution of a blue dye and after a product of a dark blue color is secured it in turn may be treated with a solution of a yellow dye, whereby a blue pigment having a green shade is obtained. Or, if desired, a pigmenting material consisting, say, of a mixture of two resinous condensation products each of which contains a different adsorbed dye may be prepared. To illustrate, 3 parts of the resinous product containing an adsorbed blue dye can be admixed or ground with 1 part of the resinous product containing an adsorbed yellow dye.

Thus, it is possible in this manner, by using two or more pigments each of which possesses a different adsorbed dye, to obtain pigmenting agents of almost any desired color or shade.

Pigmenting agents according to this invention may be employed in conjunction with other pigments of either inorganic or organic origin. For example, in making a printing ink composition of a black color by employment of carbon black as the pigment, it is customary to admix a small proportion of Prussian blue as a toner to overcome the dull, flat black color of the carbon black. In place of the Prussian blue, a resinous insoluble aldehyde-ketone condensation product containing an adsorbed blue dye may be substituted.

It should be noted that the pigmenting agents employed in the compositions of this invention are not binders or binding agents since they are insoluble, or substantially so, in drying oils as well as in many other liquids. On the other hand, the pigmenting agents suitable for my purpose can be considered as both pigments and extending agents, since in many instances only a small proportion of dye is necessary to impart the requisite color to a relatively large proportion of pigmenting agent.

As previously mentioned, natural or synthetic oil-soluble resins may be incorporated in the coating compositions and serve as binding agents in addition to the hardened or resinous film resulting from contact of the drying oil with the atmosphere. Natural resins suitable for my purpose include such resins as rosin, damar or elemi which are themselves oil-soluble as well as such resins as kauri or pontianak which becomes oil-soluble by thermal processing.

The pigmenting agents of this invention possess the distinguishing feature in that for a particular color they may be prepared with almost any desired depth or shade. Thus, if a very light blue pigment is desired, the solid resinous aldehyde-ketone condensation product can be treated with a dilute solution of a blue dye. One or more additional treatments with the solution of dye will serve to furnish a pigment of a darker color, if such be required. In other words, by regulating the concentration of the dye solution or by limiting the number of times which the condensation product is treated with the dye solution, it is possible to control the color of the pigment and consequently of the coating composition. Any regulation of color of the pigment, or of the coating composition, by incorporation of or admixture with a colorless, inert, solid material thereby can be avoided.

Furthermore, the pigmenting agents applicable for my purpose appear to exhibit low oil adsorption values and therefore fairly large proportions of these pigments can be admixed with a specified quantity of drying oil or liquid vehicle without yielding compositions which are unduly viscous, i. e., without greatly affecting the body and/or flow of the resulting composition. This property of the pigments may be of advantage, for example, in matching two coating compositions for color since it may be necessary to increase somewhat the proportion of pigment in one composition. This last-named operation (increasing the proportion of pigment) can be effected without greatly changing the physical properties (other than color) of the coating composition.

What I claim is:

1. A coating composition comprising a drying oil, a pigmenting agent consisting of a drying-oil substantially insoluble condensation product of a saturated acyclic aldehyde with a saturated acyclic ketone and containing an adsorbed dye, and a drying agent for said oil.

2. A coating composition comprising a drying oil, a pigmenting agent consisting of a drying-oil substantially insoluble condensation product of a saturated acyclic aldehyde with acetone and containing an adsorbed dye, and a drying agent for said oil.

3. A coating composition comprising a drying oil, a pigmenting agent consisting of a drying-oil substantially insoluble condensation product of formaldehyde with a saturated acyclic ketone and containing an adsorbed dye, and a drying agent for said oil.

4. A coating compostion comprising a drying oil, a pigmenting agent consisting of a drying-oil substantially insoluble condensation product of formaldehyde with acetone and containing an adsorbed dye, and a drying agent for said oil.

5. A coating composition comprising a drying oil, a pigmenting agent consisting of a drying-oil substantially insoluble condensation product of formaldehyde with methyl ethyl ketone and containing an adsorbed dye, and a drying agent for said oil.

6. A coating composition according to claim 4 in which the drying oil is linseed oil.

7. A coating composition according to claim 5 in which the drying oil is linseed oil.

8. The method of making a pigmented coating composition which comprises preparing a drying oil substantially insoluble condensation product by alkaline condensation of the water-soluble condensation product of a saturated acyclic aldehyde with a saturated acyclic ketone, contacting said insoluble condensation product with an aqueous solution of a dye to adsorb the latter in said insoluble condensation product, and suspending said dyed condensation product in a drying oil.

9. The method as set forth in claim 8, in which the saturated acyclic ketone is acetone.

10. The method as set forth in claim 8, in which the saturated acyclic aldehyde is formaldehyde.

11. The method as set forth in claim 8, in which the saturated acyclic aldehyde is formaldehyde and the saturated acyclic ketone is acetone.

12. The method as set forth in claim 8, in which the saturated acyclic aldehyde is formaldehyde and the saturated acyclic ketone is methyl ethyl ketone.

13. The method as set forth in claim 8, in which the drying oil is linseed oil.

THOMAS C. WHITNER.

REFERENCES CITED

The following references are of record in the file of this patent:

UNITED STATES PATENTS

| Number | Name | Date |
|---|---|---|
| 2,059,943 | Graves | Nov. 3, 1936 |
| 2,074,786 | Graves | Mar. 23, 1937 |
| 2,119,189 | Widmer | May 31, 1938 |
| 2,259,225 | Kienle | Oct. 14, 1941 |

FOREIGN PATENTS

| Number | Country | Date |
|---|---|---|
| 404,317 | Great Britain | Jan. 12, 1934 |